US010341219B2

(12) United States Patent
Luke et al.

(10) Patent No.: US 10,341,219 B2
(45) Date of Patent: *Jul. 2, 2019

(54) DETERMINING CONNECTIONS BETWEEN NODES IN A NETWORK

(71) Applicant: International Business Machines Corporation, Armonk, NY (US)

(72) Inventors: James S. Luke, Isle of Wight (GB); Jean-Francois Puget, Saint Raphael (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,747

(22) Filed: May 2, 2016

(65) Prior Publication Data

US 2017/0026272 A1   Jan. 26, 2017

Related U.S. Application Data

(63) Continuation of application No. 14/808,264, filed on Jul. 24, 2015.

(51) Int. Cl.
*H04L 12/751* (2013.01)
*H04L 12/733* (2013.01)

(52) U.S. Cl.
CPC .............. *H04L 45/02* (2013.01); *H04L 45/20* (2013.01)

(58) Field of Classification Search
CPC .................................... H04L 5/02; H04L 5/20
See application file for complete search history.

(56) References Cited

U.S. PATENT DOCUMENTS

| 8,412,660 | B2 | 4/2013 | Yanagisawa |
| 8,667,012 | B2 | 3/2014 | Fuchs et al. |
| 2004/0073702 | A1* | 4/2004 | Rong ...................... H04L 45/12 709/241 |
| 2007/0208693 | A1 | 9/2007 | Chang |
| 2008/0178137 | A1 | 7/2008 | Papadopoulou et al. |
| 2009/0125852 | A1* | 5/2009 | Papadopoulou .... G06F 17/5081 716/136 |

(Continued)

OTHER PUBLICATIONS

V. Adamchik, Algorithm Design and Analysis, Carnegie Mellon University, Lecture notes, Feb. 2014.*

(Continued)

*Primary Examiner* — Zhensheng Zhang
(74) *Attorney, Agent, or Firm* — Anthony V. England;SVL IP Law Edell, Shapiro & Finnan, LLC

(57) ABSTRACT

According to one embodiment of the present invention, a system determines groups of nodes within a network, each group forming a bi-connected component. The system identifies articulation nodes within the network, where each articulation node resides within each connection between a pair of nodes in the network. The system removes from the determined group each node that includes an articulation node between that node and both the source and target nodes to produce a resulting set of nodes. The system determines connections between the source and target nodes based on the resulting set of nodes. Embodiments of the present invention further include a method and computer program product for determining connections between network nodes in substantially the same manners described above.

3 Claims, 5 Drawing Sheets

(56) References Cited

U.S. PATENT DOCUMENTS

| | | |
|---|---|---|
| 2012/0250535 A1 | 10/2012 | Delling et al. |
| 2012/0317121 A1 | 12/2012 | Fuchs |
| 2013/0155068 A1 | 6/2013 | Bier |
| 2013/0308444 A1 | 11/2013 | Sem-Jacobsen et al. |
| 2013/0339352 A1 | 12/2013 | Jin et al. |
| 2015/0142796 A1 | 5/2015 | Floreskul |
| 2015/0302063 A1 | 10/2015 | Nigam |
| 2016/0112327 A1* | 4/2016 | Morris ............. H04L 47/127 398/45 |
| 2017/0026260 A1 | 1/2017 | Zehri |
| 2017/0026261 A1 | 1/2017 | Zehri |
| 2017/0026271 A1 | 1/2017 | Luke et al. |

OTHER PUBLICATIONS

A. mehta, Time-constrianed Flooding, John Hopkis Univeristy, Lcture note, May 2015.*

Newman et al., "Finding and Evaluating Community Structure in Networks," Physical Review E 69, No. 2, 2004, 16 pages.

Cao et al., "Atlas: Approximating Shortest Paths in Social Graphs," Tech. rep. Sep. 2011, Department of Computer Science, University of California, Santa Barbara, 2011, 20 pages.

Ivan Stojmenovic et al,Toward scalable cut vertex and link detection with applications in wireless ad hoc networks, Network, IEEE, vol. 25, issue 1 ISSN: 0890-8044 Publication Year: 2011, pp. 44-48 Sponsored by: IEEE communications society.

"Yen's algorithm", Wikipedia, Aug. 11, 2014, 8 pages.

"K shortest path routing", Wikipedia, Jul. 9, 2014, 5 pages.

"Dijkstra's algorithm", Wikipedia, Dec. 9, 2014, 17 pages.

"Biconnected component", Wikipedia, Dec. 4, 2014, 6 pages.

Reingold et al., "Combinatorial Algorithms: Theory and Practice", 1977 Book, Section 8.23 Biconnectivity, 3 pages.

List of IBM Patents or Patent Applications Treated as Related, May 2016, 2 pages.

* cited by examiner

DETERMINING CONNECTIONS BETWEEN NODES IN A NETWORK

CROSS-REFERENCE TO RELATED APPLICATIONS

This application is a continuation of U.S. patent application Ser. No. 14/808,264, entitled "Determining Connections Between Nodes In A Network" and filed Jul. 24, 2015, the disclosure of which is incorporated herein by reference in its entirety

BACKGROUND

Present invention embodiments relate to determining connections in a network, and more specifically, to finding nodes on simple paths between points in a network subject to a hop limit.

Analysts examining large networks (e.g. social networks) must sometimes find paths between two nodes in the network. For example, in a law enforcement or intelligence investigation, an analyst may seek to understand if information can be passed from one individual to another by constructing all possible paths through which information may flow. Finding all paths in a network is a combinatorial problem. In order to make the problem tractable, a limit on the number of paths may be provided by the analyst. For instance, the analyst may seek all paths of up to six hops between source and target. However, in the worst case, the number of paths increases rapidly with the size of the network and the required number of hops.

SUMMARY

According to one embodiment of the present invention, a system determines groups of nodes within a network, each group forming a bi-connected component. The system identifies articulation nodes within the network, where each articulation node resides within each connection between a pair of nodes in the network. The system removes from the determined group each node that includes an articulation node between that node and both the source and target nodes to produce a resulting set of nodes. The system determines connections between the source and target nodes based on the resulting set of nodes. Embodiments of the present invention further include a method and computer program product for determining connections between network nodes in substantially the same manners described above.

BRIEF DESCRIPTION OF THE DRAWINGS

Generally, like reference numerals in the various figures are utilized to designate like components.

DETAILED DESCRIPTION

Present invention embodiments relate to determining connections between nodes in a network subject to a hop limit. In an example scenario, an analyst seeks to determine whether information can be passed from one node to another in a communications network with at most H hops. The relevant paths are loopless paths (also called simple paths) because loops do not provide any additional link between source and target.

One approach is to use a conventional algorithm (e.g., Yen's algorithm) for determining the k shortest paths between two nodes in a network (or graph). However, it is not possible to know in advance the value of k such that the k shortest paths have a length at most H and such that the (k+1)th shortest path has a length greater than H. Furthermore, the number of paths (and hence the required value of k) grows non-linearly with the size of the network and the number of hops H. As a result, the running time of the k shortest path algorithm also increases non-linearly.

According to an embodiment of the present invention, another approach is to take a hop limit H, a graph G, a source node S in the graph, and a target node T in the graph, and generate a set of nodes of the graph that contains all nodes lying on simple paths up to the hop limit between the source and target. Each path between the source and target need not be explicitly computed. One aspect of a present invention embodiment is that the running time is linear in the size of the input graph. This dramatically improves performance compared to conventional approaches.

Figure 5:
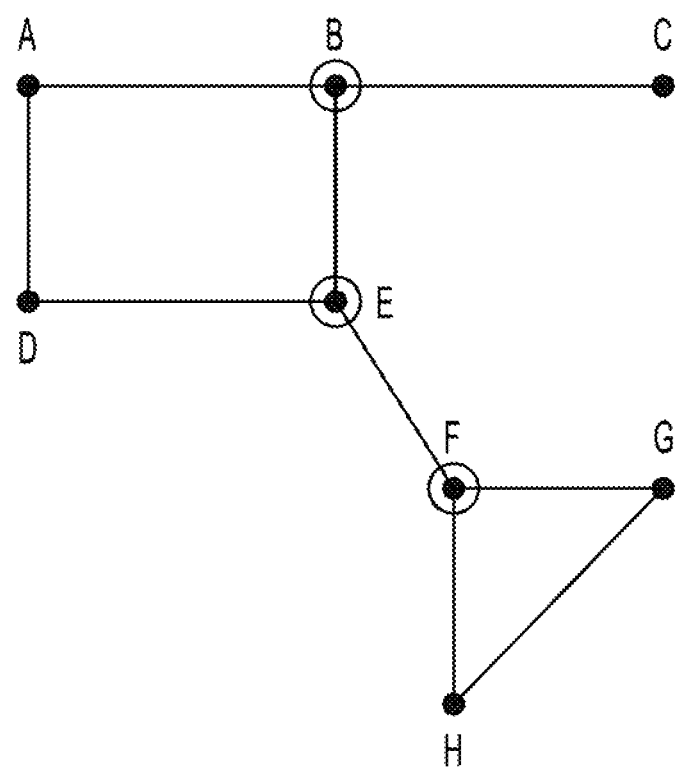
FIG. 5 is a diagram of an example graph with articulation nodes according to an embodiment of the present invention.

A present invention embodiment is based on bi-connected components and cut nodes of the graph. A bi-connected component is a maximal subset of edges of a connected graph such that the corresponding induced subgraph cannot be disconnected by deleting any vertex. In other words, the subgraph is bi-connected (not broken into disconnected pieces by deleting any single vertex). A cut vertex (also referred to as an "articulation point" or "articulation node") is any vertex whose removal increases the number of connected components. An example graph with articulation nodes is illustrated in FIG. 5. In particular, the graph includes nodes A, B, C, D, E, F, G, and H, and undirected edges connecting the pairs of nodes AB, AD, BC, BE, DE, EF, FG, FH, and GH. Nodes B, E, and F are articulation nodes because removing one of those nodes would disconnect part of the graph. For example, removing node F would disconnect nodes G and H from the rest of the graph.

Figure 1:
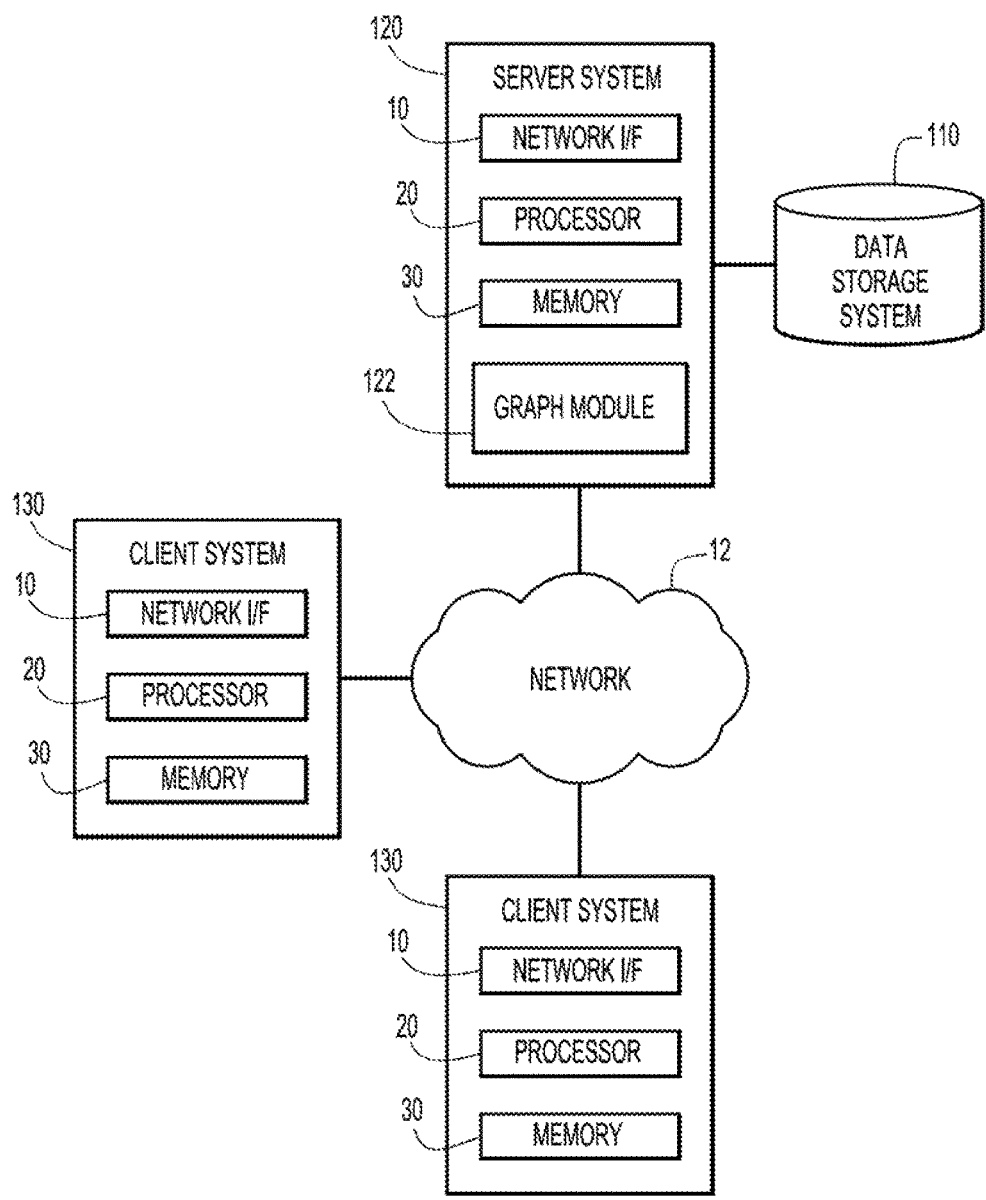
FIG. 1 is a diagrammatic illustration of an example environment for an embodiment of the present invention.

An example environment for present invention embodiments is illustrated in FIG. 1. Specifically, the environment includes one or more data storage systems 110, one or more server systems 120, and one or more client or end-user systems 130. Data storage systems 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data storage systems 110, server systems 120, and/or client systems 130 may be local to each other, and communicate via any appropriate local communication medium (e.g., local area network (LAN), hardwire, wireless link, intranet, etc.).

A data storage system 110 may be implemented by any conventional information storage system (e.g., relational database, file system server, etc.).

A server system 120 may include a graph module 122. The graph module may be implemented across plural server systems. Alternatively, the graph module may reside on a client system 130 or other computer system in communication with the client system.

Client systems 130 enable users to communicate with the graph module (e.g., via network 12). The client systems may present any graphical user (e.g., GUI, etc.) or other interface (e.g., command line prompts, menu screens, etc.) to receive commands from users and interact with the graph module and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software (e.g., database software, etc.)).

The server system, client system, and/or graph module may include one or more modules or units to perform the various functions of present invention embodiments described below (e.g., bi-directional expand, identifying bi-connected components, finding the shortest path between two nodes, removing separable by a cut node from source and target nodes, etc.), may be implemented by any combination of any quantity of software and/or hardware modules or units, and may reside within memory 30 of a server system and/or client systems for execution by processor 20.

Figure 2:
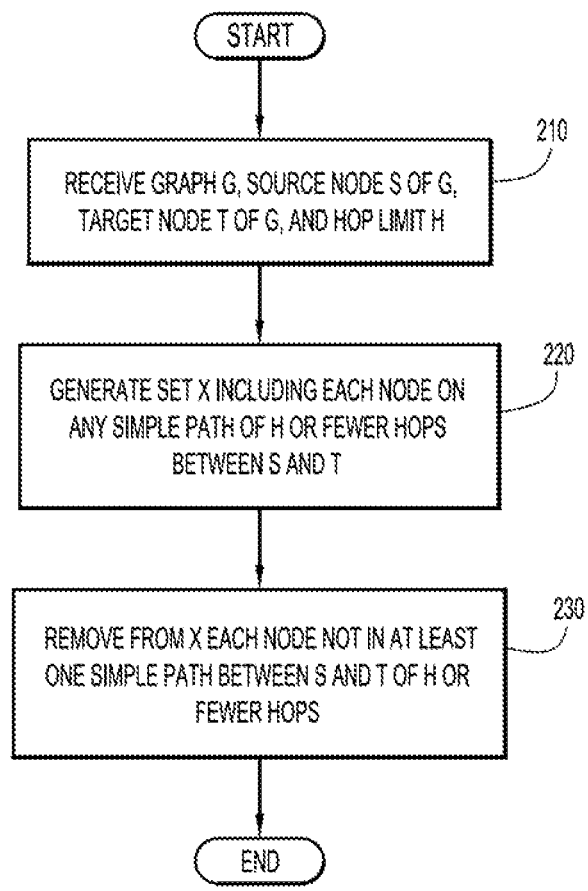
FIG. 2 is a flow diagram illustrating an example manner of finding nodes on simple paths between a source and target up to a hop limit according to an embodiment of the present invention.

An example manner of finding nodes on simple paths between a source and target up to a hop limit (e.g., via graph module 122 and server system 120 and/or client system 130) according to an embodiment of the present invention is illustrated in FIG. 2. Initially, graph module 122 receives a graph G, source node S of the graph, target node T of the graph, and hop limit H at step 210. At step 220, the graph module may generate a set X of nodes in the graph, including each node lying on any simple path of H or fewer hops between the source node S and the target node T. The set X may include nodes that do not lie on a simple path between S and T. At step 230, the graph module removes from X each node that does not lie on a simple path between S and T having H or fewer hops. The result is the set of nodes appearing on paths between S and T of H up to a hop limit H. A sub-graph of G containing the resulting nodes includes all paths up to the hop limit between the source and target. This sub-graph may be analyzed to determine the connections/paths between the source and target nodes.

Figure 3:
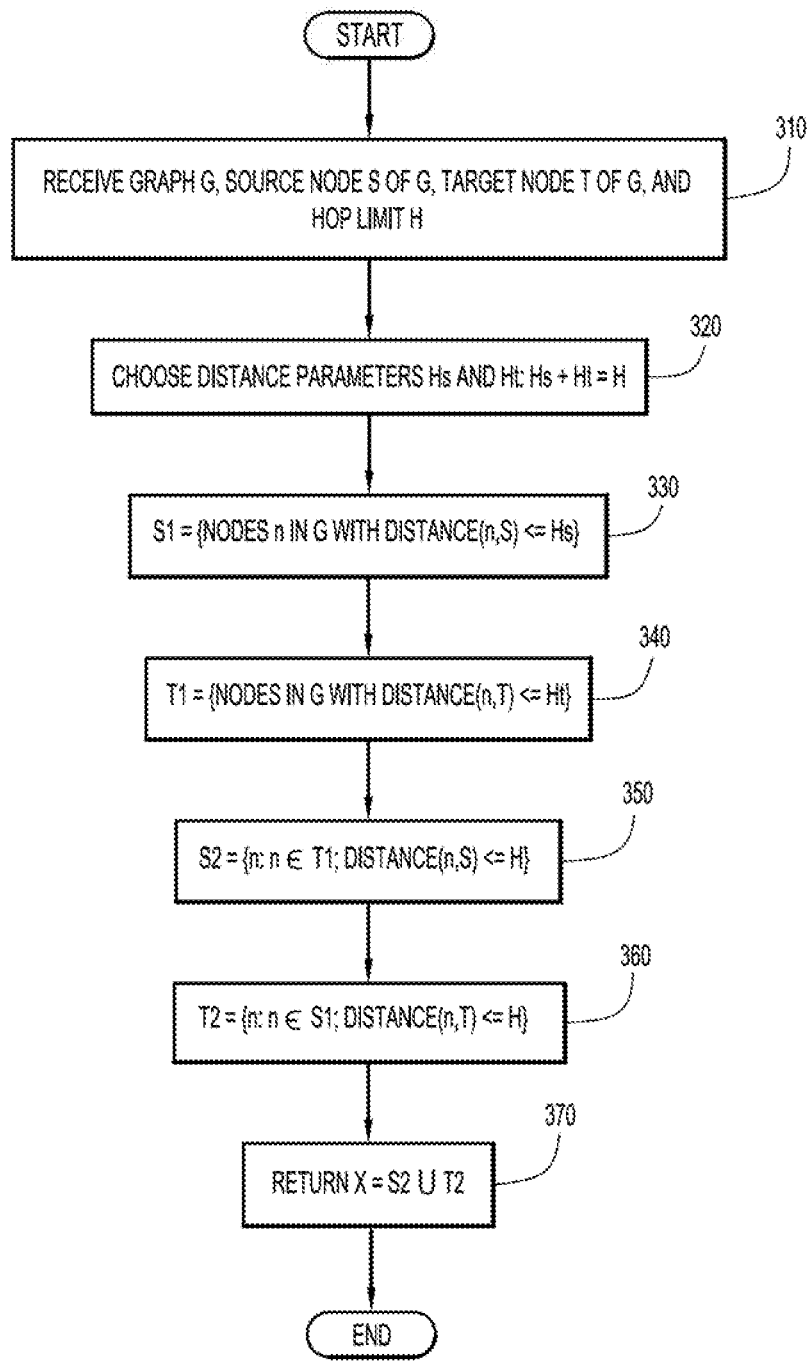
FIG. 3 is a flow diagram illustrating an example manner of generating a set of nodes including each node on any simple path between a source node and a target node up to a hop limit according to an embodiment of the present invention.

An example manner of generating a set of nodes that includes each node lying on any simple path between a source node and a target node up to a hop limit (e.g., via graph module 122 and server system 120 and/or client system 130) according to an embodiment of the present invention is illustrated in FIG. 3. Initially, graph module 122 receives graph G, source node S of the graph, target node T of the graph, and hop limit H at step 310.

Distance parameters Hs and Ht may be determined at step 320. Hs and Ht may be positive integers chosen such that Hs+Ht=H. For example, Hs may be chosen to be the largest integer less than or equal to (H+1)/2, and Ht the largest integer less than or equal to H/2.

At step 330, the graph module collects all the nodes at a distance at most Hs from source node S. This can be done by a breadth first search from source node S. The resulting collection forms a set of nodes S1.

At step 340, the graph module collects all the nodes at a distance at most Ht from target node T. This can be done by a breadth first search from target node T. The resulting collection forms a set of nodes T1.

At step 350, the graph module collects all the nodes in set T1 that have a distance at most H from source node S. This can be done by a breadth first search from S1 limited to nodes in T1. The resulting collection forms a set of nodes S2.

At step 360, the graph module collects all the nodes in set S1 that have a distance at most H from target node T. This can be done by a breadth first search from T1 limited to nodes in S1. The resulting collection forms a set of nodes T2.

At step 370, the graph module generates the set X—comprising each node in the graph G lying on any simple path of H or fewer hops between the source node S and the target node T—by forming the set union of S2 and T2.

In other words, the graph module may generate X by performing a bi-directional expand from the source node and the target node. This procedure has a running time that is linear in the size of the input graph G.

Figure 4:
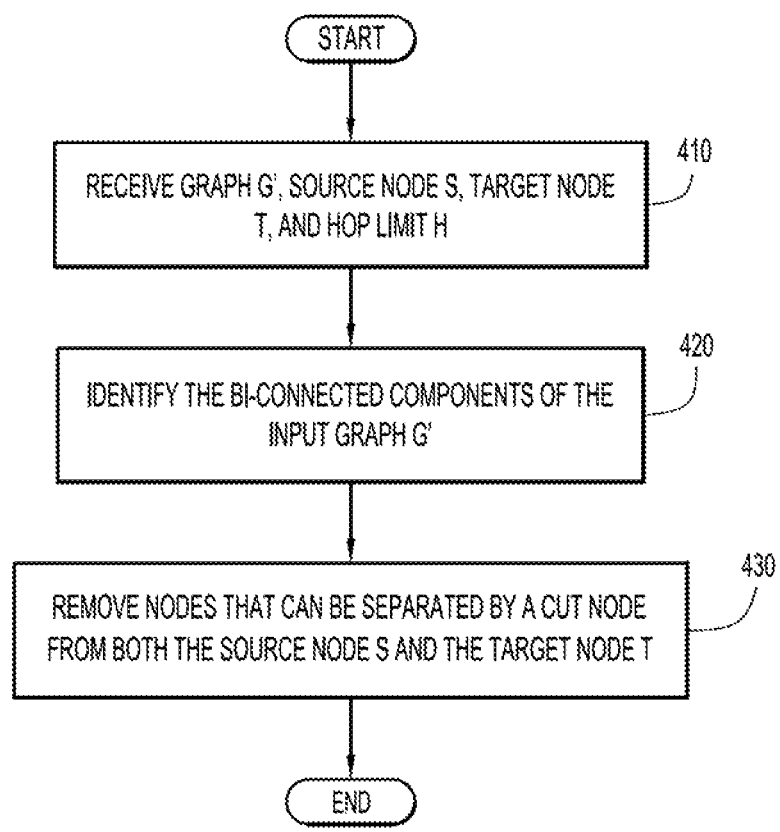
FIG. 4 is a flow diagram illustrating an example manner of removing nodes on no simple path between a source node and a target node up to a hop limit according to an embodiment of the present invention.

An example manner of removing nodes appearing on no simple path between a source node and a target node up to a hop limit (e.g., via graph module 122 and server system 120 and/or client system 130) according to an embodiment of the present invention is illustrated in FIG. 4. Initially, graph module 122 receives a graph G', the source node S, target node T of the graph, and hop limit H at step 410. Graph G' may be the original graph G of step 210 (FIG. 2). Alternatively, G' may be the sub-graph of G induced by the set of nodes X formed at step 370 (FIG. 3).

At step 420, the graph module identifies the bi-connected components of the input graph G'. This can be done in linear time using a conventional algorithm (e.g., the Tarjan and Hoperoft algorithm). Alternatively, any other conventional or custom bi-connected component algorithm may be used.

At step 430, the graph module removes from G' nodes that can be separated by a cut node from both the source node S and the target node T. According to one embodiment of the present invention, the graph module removes from G' nodes that can be separated by a cut node from both the source node S and the target node T by computing a simple path (for instance the shortest path) between source S and target T, and removing all the bi-connected components that do not contain a node in that path. The simple path between S and T may be computed using any conventional or other path finding algorithm (e.g., the Dijkstra algorithm for finding the shortest path between two nodes in a graph).

According to an alternative embodiment of the present invention, the graph module removes the nodes that can be separated by a cut node from both the source node S and the target node T by identifying articulation nodes connecting the source and target to bi-connected components of the graph G' (e.g., using a modification of the Tarjan and Hoperoft algorithm). For example, the graph module may traverse the nodes in the graph G' in a depth first search beginning from the source node S, and store, for each traversed vertex, the depth of that vertex in the search tree, and a lowpoint for that vertex. The lowpoint for a vertex v may be the lowest depth from among the depth of v, the depth of all neighbors of v other than the parent of v in the search tree, and the lowpoint of all descendents of v in the search tree. The graph module identifies vertex v (other than S) as a cut vertex if there is a child y of v such that the lowpoint of y is greater than or equal to the depth of v. If v is identified as a cut vertex, the graph module determines whether y or any descendent of y is the target node. If so, the graph module removes y and its descendants from the graph G'. The removed nodes belong to a bi-connected component that may be cut from the source and target at v.

It will be appreciated that the embodiments described above and illustrated in the drawings represent only a few of the many ways of implementing embodiments for determining connections in a network.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for determining connections between nodes in any type of network (e.g., computer network, social network, telephony network, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of determining valid connections between a source node and a target node in a communication network comprising:
   determining groups of nodes within the communication network with each group forming a bi-connected component;
   traversing the groups of nodes in a depth first search beginning with the source node;
   storing, for each traversed node, a respective depth in a search tree and a respective lowpoint;
   identifying cut nodes from the groups of nodes other than the source node, each respective identified cut node having a respective child node with a lowpoint that is greater than or equal to the depth of the respective identified cut node;
   determining nodes from the groups of nodes that can be isolated from the source node and the target node by removal of any one of the identified cut nodes;
   after determining all of the determined nodes that can be isolated from the source node and the target node by removal of the any one of the identified cut nodes, removing all of the determined nodes that can be isolated from the source node and the target node by removal of the any one of the identified cut nodes to produce a resulting set of nodes;
   determining the valid connections in the communication network between the source node and the target node that include only nodes in the resulting set of nodes; and
   providing information from the source node to the target node via one or more of the determined valid connections, wherein
   a running time for performing the step of determining the groups of nodes within the communication network through the step of removing all of the determined nodes that can be isolated from the source node and the target node by removal of the any of the identified cut nodes is linear with respect to a size of a graph of the communication network.

2. The computer-implemented method of claim 1, wherein the determined valid connections each comply with a desired hop limit.

3. The computer-implemented method of claim 2, wherein the determining groups of nodes within the communication network further comprises:
   determining a first set of nodes within a first distance from the source node;
   determining a second set of nodes within a second distance from the target node;
   determining a third set of nodes from the nodes of the second set within the desired hop limit from the source node;
   determining a fourth set of nodes from the nodes of the first set within the desired hop limit from the target node; and
   determining the groups of nodes from a set of nodes formed from a combination of the nodes in the third set of nodes and the fourth set of nodes, wherein the desired hop limit is a combination of the first distance and the second distance.

* * * * *